Patented June 21, 1938

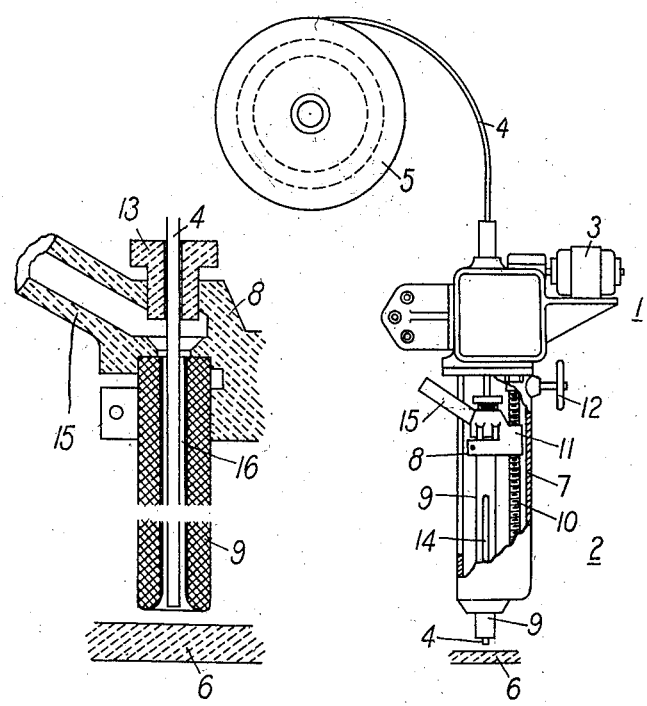

2,121,693

UNITED STATES PATENT OFFICE 2,121,693

ELECTRIC ARC WELDING

Hugh Moodie Henderson, Scunthorpe, England

Application March 31, 1936, Serial No. 71,953
In Great Britain April 1, 1935

6 Claims. (Cl. 219—10)

This invention relates to electric arc welding employing metal welding rods which are fed to the work during welding such as automatically by means of rollers through which the electric current can be supplied to the arc. According to the present invention the welding rod is fed to the arc through a tube of combustible or fusible or volatilizable protective material which tube is consumed by arc heat but at a lower rate than is the welding rod consumed, the tube being if desired also fed forward as it is consumed, at the appropriate rate, either automatically or by hand. Said tube provides protection of the weld such as against nitrogen and oxygen. It will be understood that the welding rod must pass comparatively freely through the tube and in fact the bore of the tube may be sufficiently greater than the rod thickness that a flow of gas or powdered flux may be maintained through the tube during welding. The tube which is preferably relatively short, may be supplied with welding current to ensure that the tube may be consumed regularly without depending upon the current traversing the rod so that the generation of the protective medium is constant, the main welding current being supplied to the rod such as through feeding rollers as aforesaid.

The tube may be wholly of carbon or may contain carbon and/or fluxing materials, these being rendered sufficiently conducting by admixture therewith of conducting material, in the case where an auxiliary arc takes place between the tube and the work.

To enable the invention to be clearly understood a convenient embodiment of a welding apparatus in accordance therewith will now be described by way of example with reference to the accompanying drawing in which Figure 1 is an elevation partly in section of said embodiment of welding apparatus and Fig. 2 is an enlarged view of the lower part of the embodiment shown in Fig. 1, with certain parts omitted.

Referring to the drawing, the welding head shown in Fig. 1 comprises broadly the upper part 1 and the lower part 2, of which the upper part 1 may comprise in general any known or convenient form of automatic means including the electric motor 3, for feeding the electrode wire 4 from a reel 5 through the welding head towards the work 6 and for supplying the welding current to said wire.

The lower part 2 of the welding head comprises any convenient casing 7 in which is constrained for axial movement the holder 8 for the protection tube 9 which is adapted to have one end clamped to said holder. The latter is adapted to be moved in the axial direction by means of the screw 10 which is engaged by a corresponding threaded portion 11 of the tube holder 8 and which is mounted at its ends for rotation such as through bevel gearing (not shown) from a handwheel 12 or alternatively said screw may be operated through reduction gearing from the feed mechanism contained within the upper part 1 of the welding head, or according to a further modification said screw may be caused to rotate by a motor under the control of the current in an auxiliary arc, such as through a relay, which may be formed between the lower end of the protection tube 9 and the work 6, in which case provision is also made for supplying current to the holder 8 which may be insulatingly mounted with respect to the casing of the welded head, and which may carry an insulating bushing 13 (Fig. 2) through which the welding electrode wire 4 passes. Guide rods or the equivalent 14 may be fixed in the casing 7 to maintain the tube 9 in correct axial alignment.

The tube holder 8 may be provided with a duct 15 whereby gas or flux powder may be fed to the adequate annular space 16 between the electrode wire 4 and the bore of the protection tube 9. If flux powder is fed in this manner it may be supplied to a hopper (not shown) associated with the duct 15.

The protection tube 9 may consist wholly or partly of carbon or it may contain carbon and/or fluxing materials which if necessary may be rendered sufficiently electrically conducting by reason of suitable additive materials. If desired the bore of the protection tube 9 may be initially provided with an adherent coating of flux material.

In using the apparatus illustrated by Figs. 1 and 2, the gas, such as carbon monoxide, may be first admitted to the duct 15 slowly, whereupon the arc between the electrode wire 4 and the work 6 may be struck so that welding proceeds. The protection tube 9 may then be moved down to the correct relatively short distance above the work 6, being intermittently or continuously adjusted by the operator or automatically as the case may be, as it becomes consumed.

It will be understood that the invention is not limited to the particular details of construction shown in the drawing.

I claim:—

1. The method of electric arc welding which consists in supplying the electric arc welding current direct to a metal welding wire, feeding said wire to the work through and relatively to a thick walled rigid tube which is linearly consumable at its end adjacent the work by heat conducted and radiated from the arc between said wire and work which tube by reason of its composition and wall thickness is consumable at a considerably lower rate than is the welding wire, said tube being composed at least mainly of non-metallic material which by being thus consumed continuously provides an annular supply of decomposition products around the arc substantially completely to protect the latter and the weld pool from the effects of the nitrogen and oxygen of the ambient air, and feeding said tube towards the work at the correspondingly reduced rate.

2. The method of electric arc welding which consists in supplying the electric arc welding current direct to a metal welding wire, feeding said wire to the work through and relatively to a thick walled rigid tube which is linearly consumable at its end adjacent the work by heat conducted and radiated from the arc between said wire and work which tube by reason of its composition and wall thickness is consumable at a considerably lower rate than is the welding wire, said tube being composed mainly of carbon and fluxing material which by being thus consumed continuously provides an annular supply of decomposition products around the arc substantially completely to protect the latter and the weld pool from the effects of the nitrogen and oxygen of the ambient air, and feeding said tube towards the work at the correspondingly reduced rate.

3. The method of electric arc welding which consists in supplying the electric arc welding current direct to a metal welding wire, feeding said wire to the work through and relatively to a thick walled rigid tube which is linearly consumable at its end adjacent the work by heat conducted and radiated from the arc between said wire and work which tube by reason of its composition and wall thickness is consumable at a considerably lower rate than is the welding wire, said tube being composed at least mainly of non-metallic material which by being thus consumed continuously provides an annular supply of decomposition products around the arc substantially completely to protect the latter and the weld pool from the effects of the nitrogen and oxygen of the ambient air, and feeding said tube towards the work at the corresponding reduced rate, said tube having a bore greater than the diameter of the wire, and feeding through the annular tube thus provided a substance which is beneficial to the welding.

4. For carrying out the welding method claimed in claim 1, a welding head comprising a frame structure and carried thereon mechanical means for continuously feeding a metal welding wire to the work, means for feeding the arc current direct to said wire, a thick-walled rigid tube through which said wire is fed, a clamp for the upper end of said tube, and mechanical means for moving said clamp to feed said tube in the same direction as, but at a lower rate, than said wire is fed.

5. For carrying out the welding method claimed in claim 1, a welding head comprising a frame structure and carried thereon mechanical means for continuously feeding a metal welding wire to the work, means for feeding the arc current direct to said wire, a thick-walled rigid tube through which said wire is fed, a clamp for the upper end of said tube, and mechanical means for moving said clamp to feed said tube in the same direction as, but at a lower rate, than said wire is fed, said clamp having a duct whereby fluid can be supplied between said wire and tube.

6. For carrying out the welding method claimed in claim 1, a welding head comprising a frame structure and carried thereon mechanical means for continuously feeding a metal welding wire to the work, means for feeding the arc current direct to said wire, a thick-walled rigid tube through which said wire is fed, a clamp for the upper end of said tube, said clamp being carried by but insulatingly mounted with respect to said frame structure, means for feeding the arc current diect to said clamp, and mechanical means for moving said clamp to feed said tube in the same direction as, but at a lower rate, than said wire is fed.

HUGH MOODIE HENDERSON.